United States Patent [19]

Kovats

[11] 4,128,166

[45] Dec. 5, 1978

[54] ENDLESS BELT CONVEYOR SYSTEM

[75] Inventor: Lawrence H. G. Kovats, Mentor, Ohio

[73] Assignee: Mayfran, Incorporated, Cleveland, Ohio

[21] Appl. No.: 847,325

[22] Filed: Oct. 31, 1977

Related U.S. Application Data

[63] Continuation of Ser. No. 718,111, Aug. 27, 1976, abandoned.

[51] Int. Cl.$^2$ .............................................. B65G 41/00
[52] U.S. Cl. .................................... 198/860; 198/838; 238/1
[58] Field of Search .................. 193/35 B; 238/283, 1; 198/811, 820, 822-830, 837, 838, 842, 843, 860, 861, 760

[56] References Cited

U.S. PATENT DOCUMENTS

| 2,689,637 | 9/1954 | De Armond | 198/836 |
|---|---|---|---|
| 2,910,168 | 10/1959 | Shaw | 198/838 |
| 3,042,093 | 7/1962 | Hesse et al. | 198/760 |

*Primary Examiner*—Evon C. Blunk
*Assistant Examiner*—Jeffrey V. Nase
*Attorney, Agent, or Firm*—Meyer, Tilberry & Body

[57] ABSTRACT

An endless belt conveyor for heavy materials handling is provided in which shock forces generated by the loading of heavy objects onto the conveyor are absorbed in the vertical, longitudinal and lateral directions with respect to the conveyor by resilient suspension means such as a plurality of rubber shear spring blocks which are associated with the support structure for the track upon which the conveyor belt moves. The belt is comprised of slat links having a central transverse reinforcing beam and slat link covers surrounding the transverse reinforcing beam which converge to either side of the beam at a point intermediate the vertical distance between the top and bottom portions of the beam. Material loaded on top of the conveyor slat links contacts the higher portion of the slat link at the portion of the slat link where the beam is located, the beam acting to distribute the shock from the material loaded thereon along its length and to transmit such shock loadings to the conveyor support structure which absorbs the shock.

15 Claims, 11 Drawing Figures

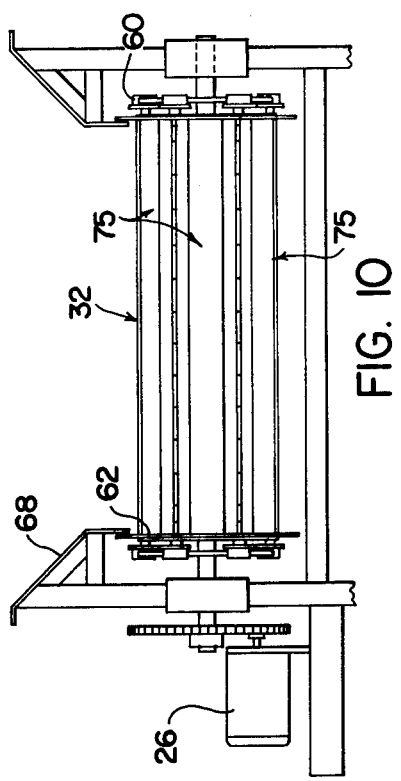
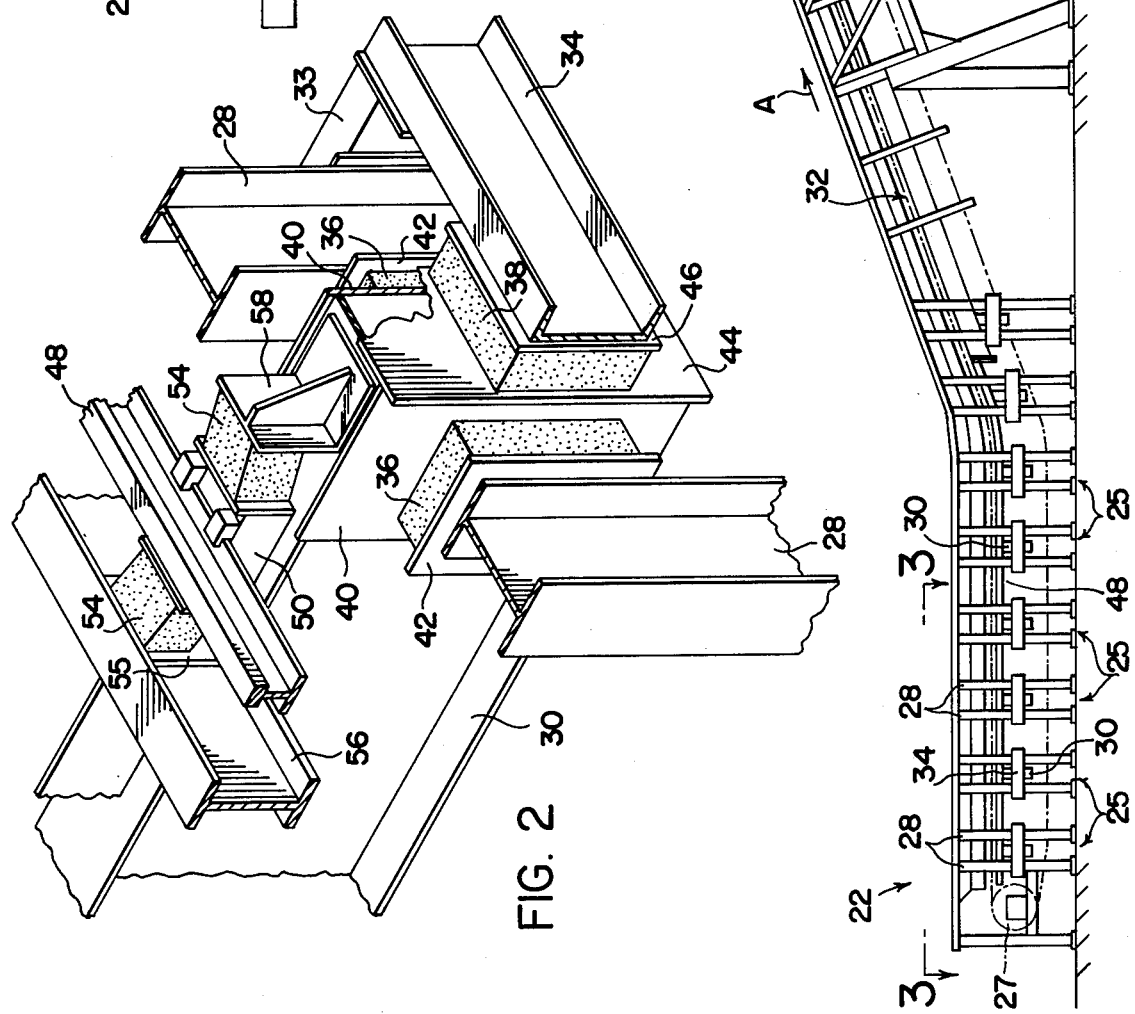

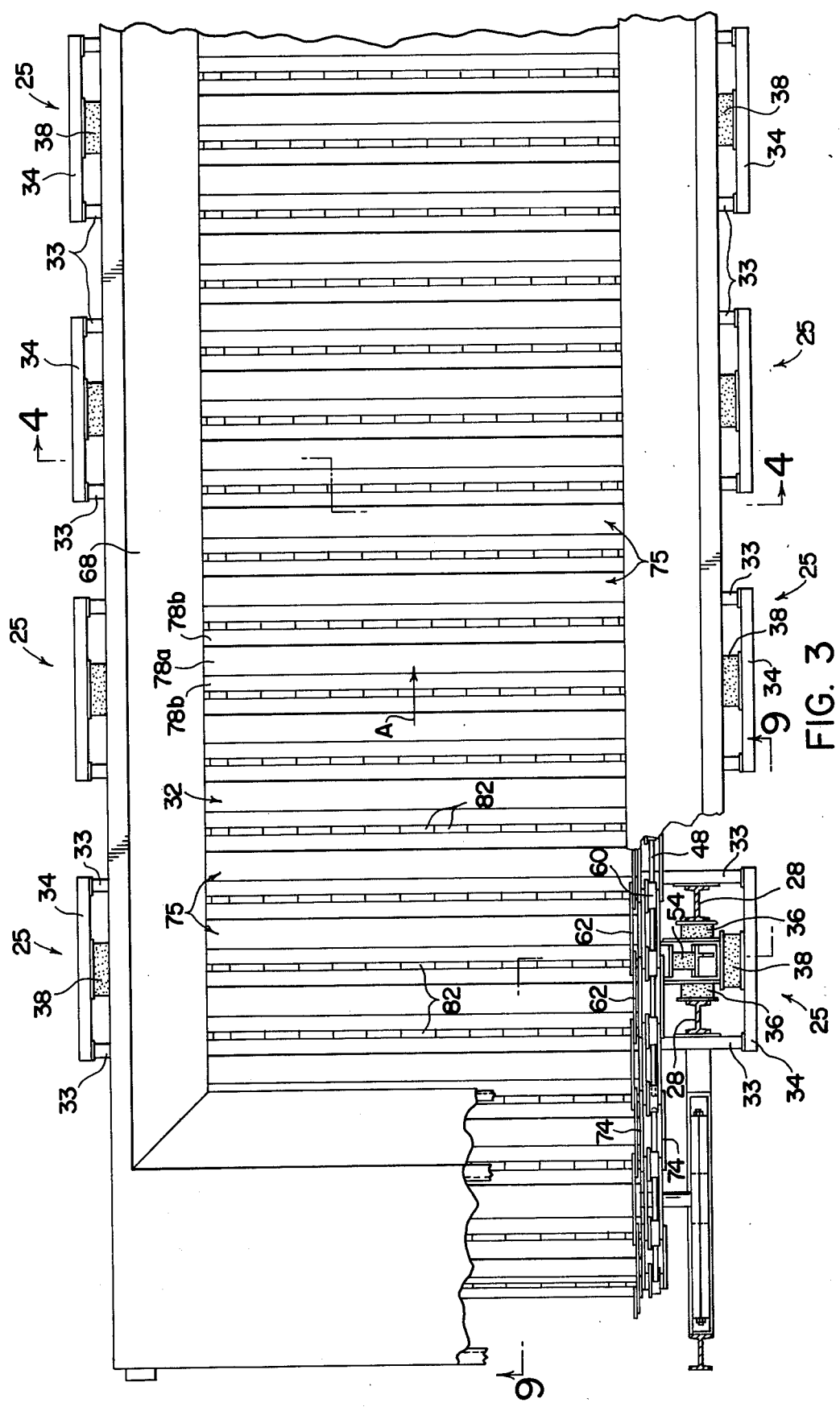

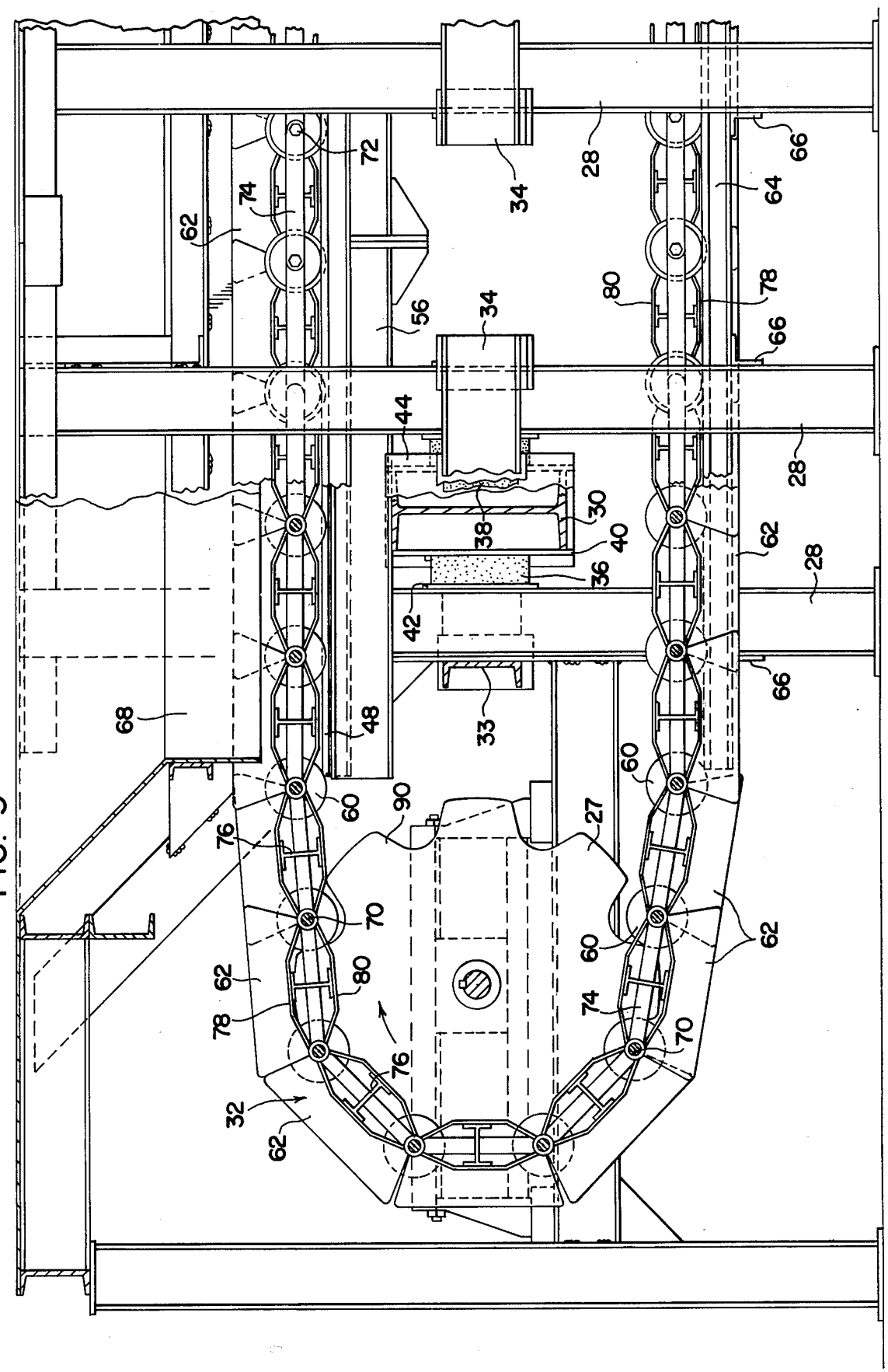

ENDLESS BELT CONVEYOR SYSTEM

This is a continuation of application Ser. No. 718,111, filled Aug. 27, 1976, now abandoned.

The invention relates generally to the art of endless belt conveyor systems and more particularly to a heavy materials conveyor in which reinforced slat links travel on and work in conjunction with a track and track support system which is constructed so as to absorb shock generated through the dropping of heavy materials on to the endless conveyor belt. Resilient means e.g. rubber shear blocks on the conveyor support structure absorb shocks in all possible modes of travel, that is, vertically, laterally and longitudinally of the conveyor.

BACKGROUND OF THE INVENTION

There has long been a problem with regard to wear and tear on heavy materials handling conveyors. Such conveyors are usually crane loaded and it is often the case that the crane operator will accidentally, or of necessity, drop heavy-weight materials which are to be conveyed onto the conveyor from a substantial height, thereby creating extreme impact forces. In the past, such conveyors have been rigidly supported so that the structure of the conveyor was forced to bear the entire shock of the dropping heavy weight. Further, former designs of slat links of the endless conveyor belt were not of a construction which could withstand such repeated abuse for extended periods of time. The structure of the conveyor would take a constant beating which would result in the damage of parts through bending, breaking or general loosening of the structure. Eventually, such conveyors would have to be either extensively overhauled or replaced entirely, both of which were extremely costly operations.

Accordingly, it is an object of this invention to provide a conveyor assembly for receiving and conveying heavyweight articles which incorporates various structures which tend to reduce or eliminate the damage due to wear and tear caused by dropping heavy material loadings through use of the conveyor in its intended manner.

It is a further object of this invention to provide a track support assembly for an endless belt conveyor which incorporates resilient suspension means for absorbing shock forces in the three modes of travel, i.e., vertical, longitudinal, and lateral directions relative to the plane of the conveyor belt and the conveying direction.

It is yet another object of the invention to provide a conveyor track and belt support structure for absorbing shock loadings transferred to the conveyor by the loading of a heavy weight object onto the conveyor, the support structure comprising resilient suspension means made of solid rubber shear blocks disposed at the various support stations for the conveyor track assembly which coact to absorb shock through resiliency in shear in the various lateral, longitudinal, and vertical modes.

It is a still further object of this invention to provide a conveyor belt slat link which is reinforced in order to avoid damaging deformation from shock loading.

It is yet another object of this invention to provide a conveyor belt slat link having an internal I-beam which reinforces the slat link and causes shock loading from objects deposited thereon to be transferred through the I-beam to a support structure of the conveyor.

These and other objects of the invention will appear through a description of the preferred embodiment taken in conjunction with the accompanying drawings forming a part of this specification.

BRIEF DESCRIPTION OF THE DRAWINGS

While the invention may take physical form in a variety of parts and arrangements of parts, a preferred embodiment of the invention is shown in the drawings which are presented for the purposes of illustration and not limitation and show a conveyor assembly in accordance with the present invention in which:

FIG. 1 is a side elevational view of a material conveyor assembly illustrating a preferred embodiment of the present invention;

FIG. 2 is a perspective view, partially in section of a portion of the preferred support structure of a conveyor assembly;

FIG. 3 is a top elevation view, partially in section of the loading end of the conveyor taken along line 3—3 of FIG. 1;

FIG. 9 is a side elevational view, partially in section and partially in phantom of a portion of the conveyor assembly taken along line 9—9 of FIG. 3;

FIG. 10 is an end elevational view taken along line 10—10 of FIG. 1 showing the head-end drive structure of the conveyor in accordance with the preferred embodiment of the present invention;

DETAILED DESCRIPTION OF THE PREFERRED EMBODIMENT AND THE DRAWINGS

Figure 4:
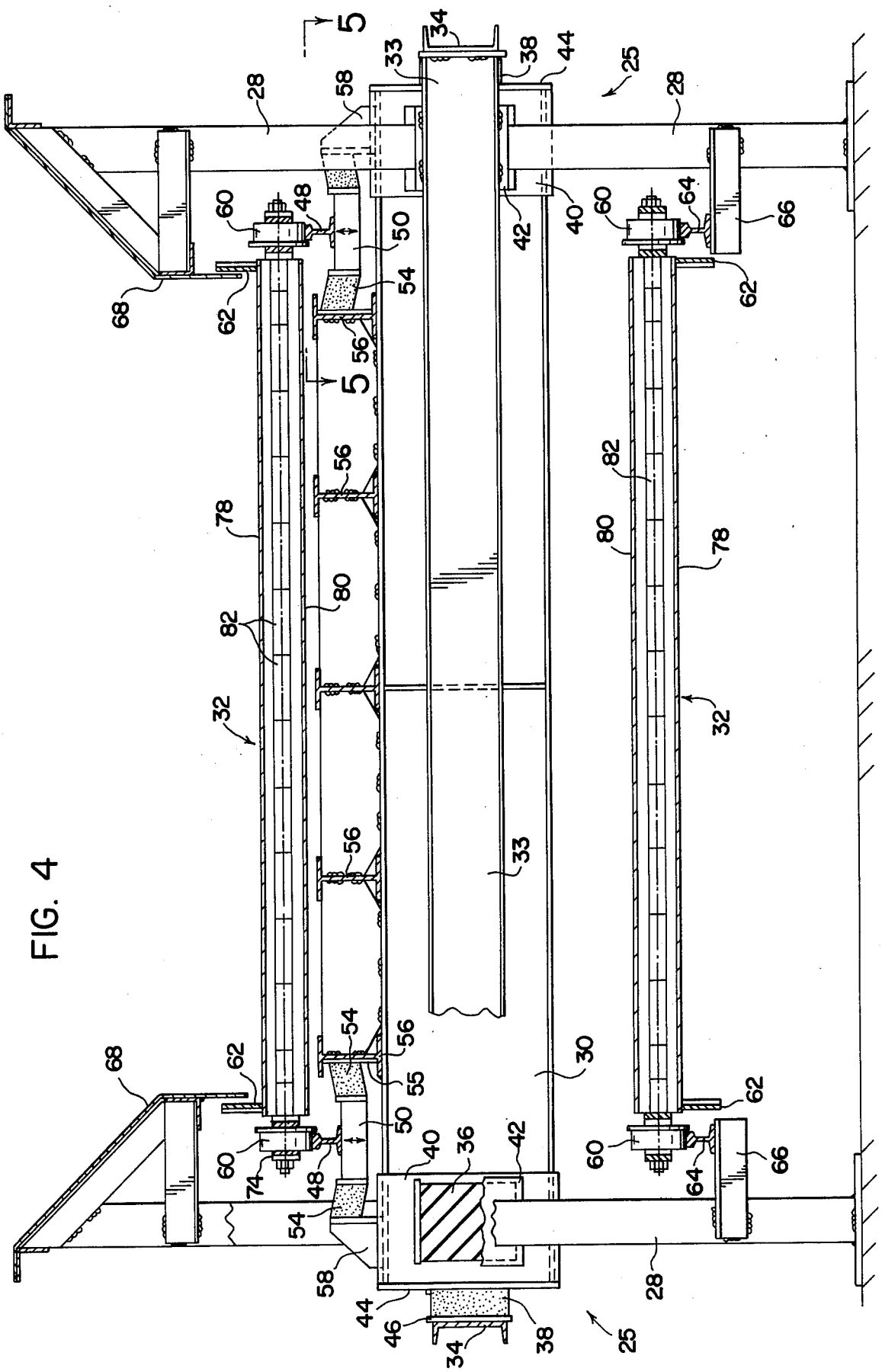
FIG. 4 is a cross-sectional, elevational view of the conveyor assembly taken along line 4—4 of FIG. 3.

The same reference numbers are used to indicate identical parts throughout the description of the drawings.

FIG. 1 shows a conveyor structure 20 comprised of an endless conveyor belt 32 moving on a supporting track 48 and having a loading end 22, an intermediate, upwardly sloping conveying portion 23 and a head end 24. In the area of loading end 22, track support means are provided comprised of a plurality of track support stations 25 disposed in side by side relationship and on both sides of the conveyor. The belt 32 travels in a conveying direction indicated generally by arrow A through the action of drive means 26 disposed at the head end 24. Idler pulley 27 located at the loading end 22 of conveyor 20, acts in conjunction with drive means 26 to guide the conveyor belt 32 around the ends of the conveyor.

Each track support station 25 is comprised of a pair of vertically extending support members 28 disposed on either side of a transversely extending track support beam 30. A pair of channel shaped tieing members 33 extend transversely of the conveyor and are fastened adjacent their ends to a respective vertical support member 28. These members 33 act to structurally integrate the vertical members 28. Tie members 34 are rigidly connected to the ends of the transverse tie members 33 so as to create a unified structure connecting the pairs of vertical support members 28 in each set of support stations 25 transversely of the conveyor.

In accordance with the invention, each transverse track support beam 30 is resiliently suspended from points between the pairs of vertical support members 28 and end plates 34 by a set of resilient suspension means, preferably rubber shear blocks 36 and 38 respectively.

Rubber shear blocks 36 are attached at their opposite sides or shear faces to respective ones of the two vertical support members 28 in each track support station 25 and the corresponding sides of transverse track support beam 30 through mounting plates 42 and 40 respectively. These blocks 36 are disposed so that the shear plane in which they act is perpendicular to the plane of conveyor belt 32 and parallel to transverse track support beam 30 so that the blocks 36 act in shear to resiliently absorb shock loadings on the conveyor belt in both the vertical direction perpendicular to the plane of conveyor belt 32 and in the lateral direction transverse to the conveying direction A.

Similarly, rubber shear blocks 38 are attached at their opposite sides or shear faces to respective ends of transverse track support beam 30 and the inside of tieing members 34 through mounting plates 44 and 46 respectively mounted on the transverse track support beam 30 and tieing member 34. Shear block 38 is disposed so that the shear plane in which it acts is perpendicular to the plane of conveyor belt 32 and parallel to the conveying direction A so that blocks 38 act in shear to resiliently absorb shock loadings on the conveyor belt in both the vertical direction perpendicular to the plane of the conveyor belt 32 and longitudinally in and counter to the conveying direction A.

Through the action of these resilient support means, transverse track support beam 30 is supported so as to be resiliently moveable in the lateral, longitudinal and vertical directions relative to the plane of the conveyor belt 32 and the conveying direction A.

In the preferred embodiment, the conveyor track 48 is comprised, as shown, of a pair of longitudinally extending spaced parallel rails which are mounted on each of the rack support beams 30, adjacent the respective ends thereof, by means of a plurality of secondary resilient support means including a track support block 50 to which the track 48 is mounted and a pair of rubber shear blocks 54 spaced apart transversely of and positioned approximately equidistant to each side of the respective track rail 48 and attached at one end to the opposite sides of the track support block 50, the shear blocks 54 acting in shear in a plane perpendicular to the plane of conveyor belt 32 and parallel to the conveying direction A. The other ends of rubber shear blocks 54 have end plates 55 attached respectively to the web of longitudinally extending connecting beam 56 and a support bracket 58, both of which are directly attached to transverse track support beam 30. Support block 50 is thus normally positioned in a slightly spaced relationship to and above support beam 30. Thus, small loadings are absorbed by shear blocks 54 in the vertical and longitudinal directions. Larger shock loadings cause support block 50 to engage the upper surface of transverse track support beam 30 and these loadings are transmitted through transverse track support beam 30 to rubber shear blocks 36, 38 disposed in the vertical support stations 25 at the loading end 22 of the conveyor 20.

As shown in FIGS. 3 and 4, the parallel rows of track support stations 25 act to resiliently support the tracks 48 upon which conveyor belt 32 travels in conveying direction A. Transverse tie members 33 pass continuously laterally across the conveyor to solidly and rigidly connect the corresponding laterally opposite vertical support members 28 in each of the sets of laterally paired vertical support stations 25. With the addition of end tie members 34 to the ends of transverse tie members 33, it can be seen that a four-sided, rigid box is constructed which is transverse to the conveying direction and connected to four vertical support members 28, that is, two vertical support members in each of the two laterally opposite vertical support stations, one station located on each side of the conveyor belt. A plurality such tied pairs of vertical support stations 25, longitudinally spaced along the conveyor, comprises the resilient support structure of the conveyor. As can also be seen in FIG. 3, rubber shear blocks 36 act to resiliently support and connect transverse track support beam 30 to vertical support members 28. These rubber shear blocks 36 act through resiliency in shear to absorb shocks in the vertical and lateral directions, thereby acting in a plane perpendicular to the conveyor belt 32 and transverse to the conveying direction A. Shear blocks 38 disposed on the ends of transverse support beam 30 act to absorb shock loadings through resiliency in shear in the vertical and longitudinal directions thereby acting in a plane perpendicular to the conveyor belt 32 and parallel to the length thereof and in directions both in and counter to the conveying direction A. Thus, it can be seen that, in accordance with the invention, the shear blocks 36 and 38 act together to absorb shock loadings in all three directions, that is vertically, longitudinally, and laterally relative to the conveyor belt 32 and the conveying direction A.

As shown in FIG. 4, conveyor belt 32 rides on conveyor tracks 48 in the conveying direction through the action of conveyor chain rollers 60 guided thereon. The conveyor has upstanding side members 62 attached to conveyor belt 32 at its lateral edges which act to retain the material to be conveyed on the conveyor belt.

Loadings on the top of conveyor belt 32 act to force the conveyor belt downwardly against the upward action of resilient shear blocks 54. When the limits of their resiliency has been reached or when conveyor belt 32 bottoms out against the top portions of longitudinal connecting members 56 and/or track support block 50 bottoms out against the top portion of transverse track support beam 30, any additional forces are transmitted to and absorbed by rubber shear blocks 36 and 38 disposed on the ends of transverse track support beam 30 at the track support stations 25 as previously described. Thus, the invention provides a two-stage shock absorbing feature through the use of the rubber resilient mounting of track 48 on track support blocks 50 resiliently suspended by shear blocks 54 which upon bottoming out transfer impact forces to shear blocks 36,38 suspending transverse track support beam 30. Light loadings are absorbed by shear blocks 54 of the device while heavy shock loadings are transmitted directly to the transverse track support beam 30 to be absorbed by resilient shear blocks 36 and 38 at the track support stations 25 when the belt 32 bottoms out on longitudinal connecting members 56. The connecting members 56 also serve to transfer a portion of the shock loading to adjacent track support stations. This is so because the arrangement of the several transverse track support beams 30 tied together by the connecting members or beams 56 constitutes in effect a unitary track supporting sub-frame assembly which is floatingly suspended in its entirety from the vertical support members 28 at the various track support stations 25 by means of the rubber shear blocks 36 and 38.

As shown in FIG. 4, a longitudinally extending return track 64 is provided below the transverse track support beam 30 in order to guide the conveyor belt on its return to the loading end 22 from the head end 24 of the conveyor 20. Return tracks 64 are mounted on transversely extending mounting bars 66 attached to vertical support members 28.

Figure 5:
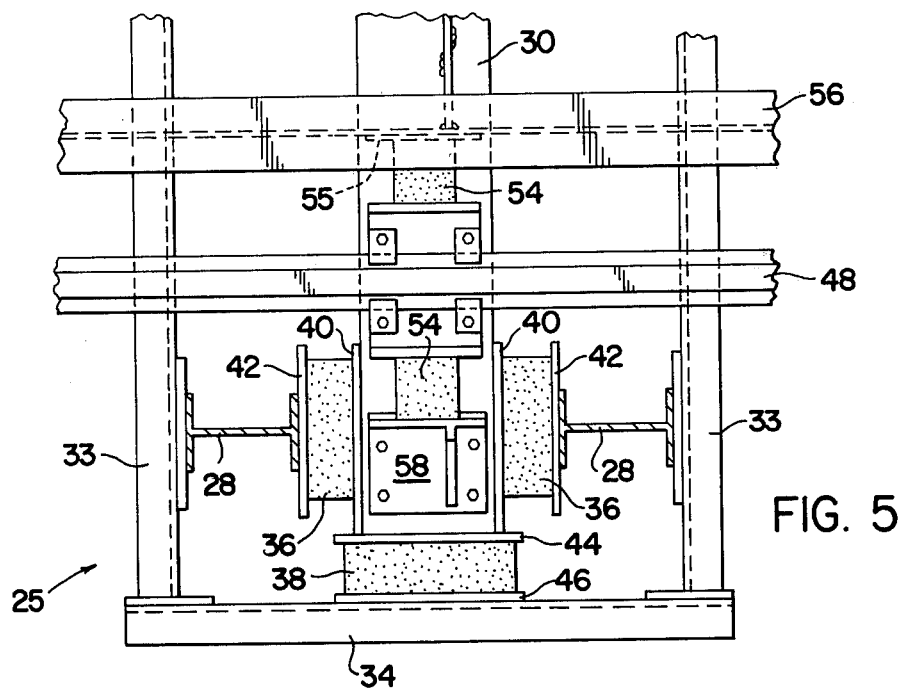
FIG. 5 is a top elevational view of a preferred track support station taken along lines 5—5 of FIG. 4.

FIG. 5 again shows a vertical support station in accordance with the present invention illustrating the relationship of the tieing members 33 and 34, the vertical support members 28, resilient shear blocks 36 and 38 and their relation to transverse track support beam 30. As seen in the figure, conveyor track 48 extends longitudinally and perpendicularly of the transverse track support beam 30 as does longitudinal connecting member 56 which is attached thereto and connected to adjacent track support beams 30 disposed along the conveyor loading end at the various pairs of vertical support stations 25.

Figure 7:
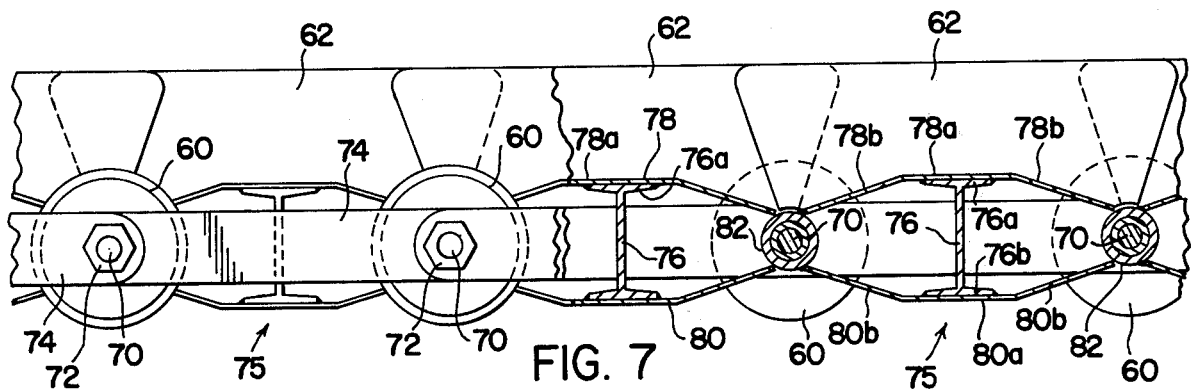
FIG. 7 is a side elevational view, partially in section of a portion of the conveyor belt as shown in FIG. 6 taken along line 7—7 thereof.
Figure 8:
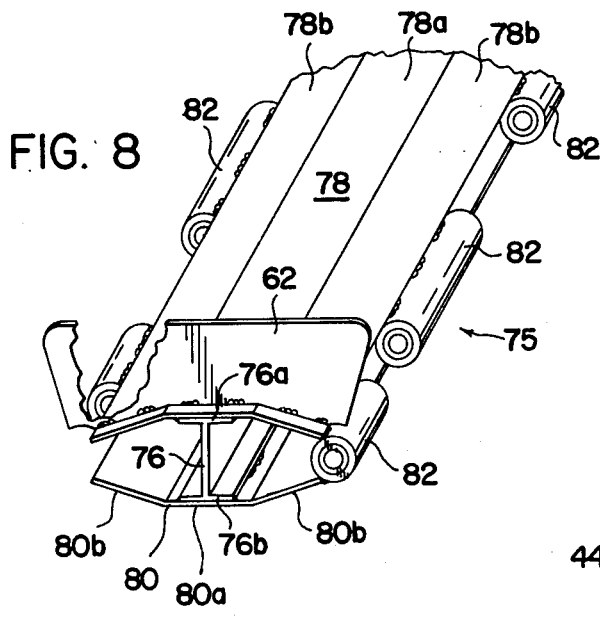
FIG. 8 is a perspective view of a single slat link constructed in accordance with a preferred embodiment of the present invention.
Figure 11:
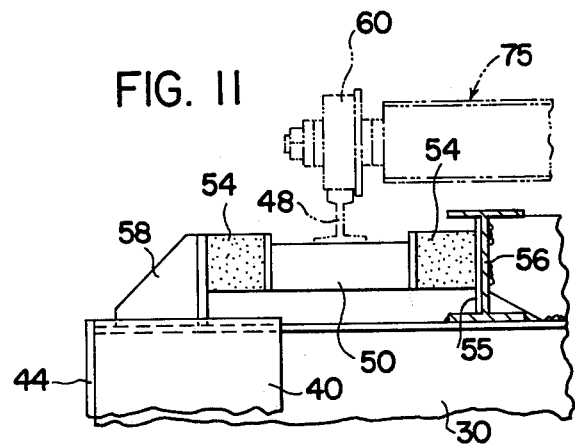
FIG. 11 is a front elevational view of a portion of the suspension apparatus in accordance with the preferred embodiment of the present invention showing a support assembly in the unloaded state and the loading members in phantom.
Figure 6:
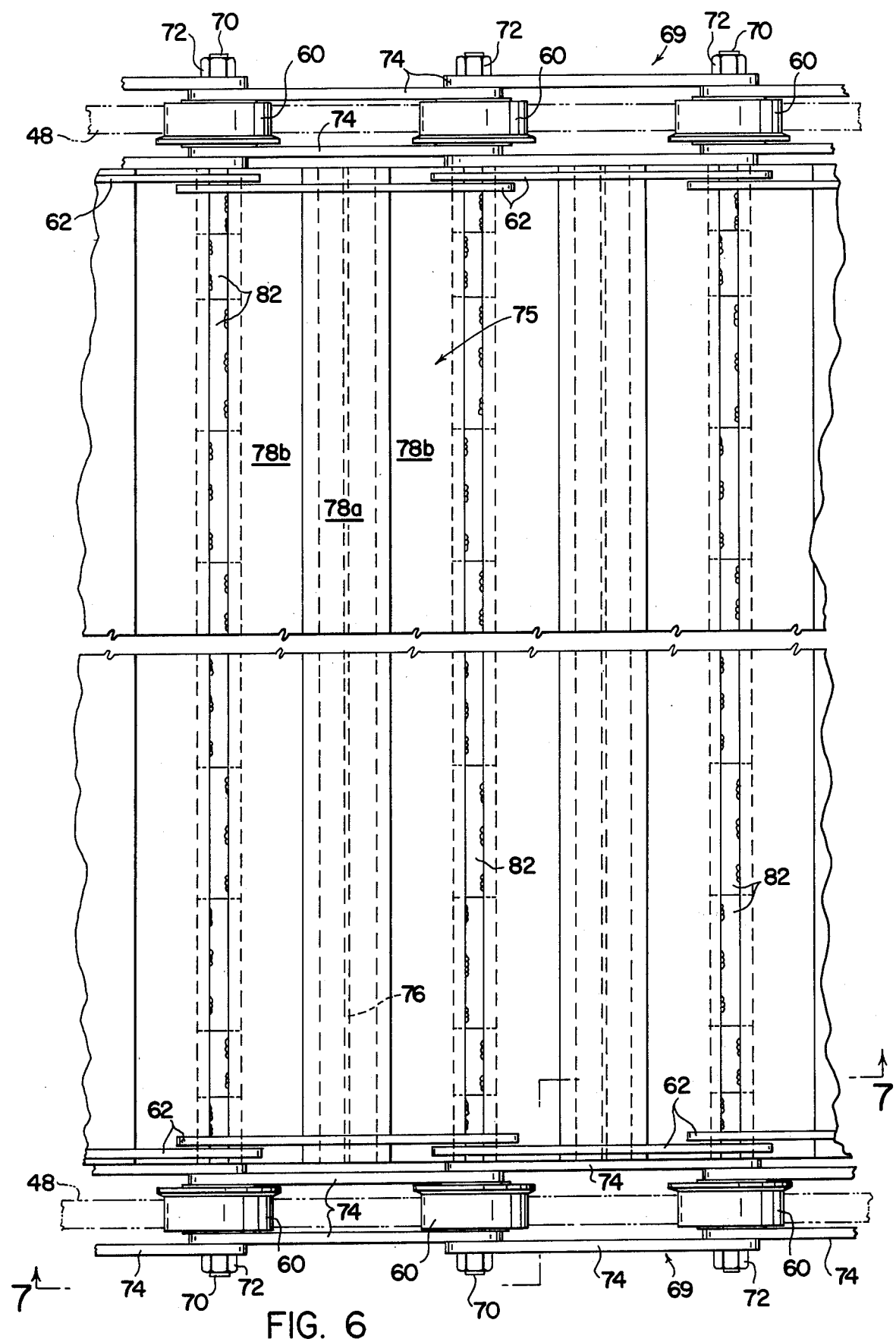
FIG. 6 is a top elevational view, partially in phantom of a portion of the conveyor belt assembly in accordance with the present invention.

A portion of the conveyor belt which may advantageously be used in conjunction with the present invention is shown in FIGS. 6, 7 and 8. Disposed along the side of the conveyor belt are rollers 60 which act to support the conveyor belt as it moves along the coveying track, the rollers 60 being mounted on transversely extending axles 70 interconnected by chain links 74 extending between adjacent axles 70 forming an endless chain 69. Fastening means such as nut 72 is used to hold chain links 74 onto the axles 70 at each chain roller 60. The conveyor belt is comprised of a series of load supporting slat links 75 extending between the extended axles 70 of the conveyor rollers 60 and transversely of the conveyor. In accordance with the invention each slat link 75 is comprised of a transversely extending beam member 76, a top slat link cover 78, and a bottom slat link cover 80. Transverse beam member 76 is shown and described in the preferred embodiment as having an I-beam configuration. It will be understood however, that transverse beam 76 may take any other form such as a T-beam, an L-beam, a channel beam or a rectangular beam.

Top slat link cover 78 is comprised of a top portion 78a passing across the top flange 76a of the I-beam member 76 and attached thereto in a plane parallel to the conveying direction. Portions 78b of the top slat link cover 78 extend angularly downwardly to the adjacent axle portions of the conveyor apparatus and are connected to a plurality of transversely spaced tubes 82 which extend transversely of the conveyor.

Similarly, a bottom slat link cover 80 is comprised of flat portion 80a attached along the bottom flange 76b of transverse I-beam 76. The flat portion 80a of bottom slat link cover 80 is in a plane parallel to the plane of portion 78a of the top slat link cover 78 and parallel to the conveying direction while portions 80b of bottom slat link cover 80 converge upwardly toward and are welded to tubes 82. The tubes 82 are spaced a distance approximately equal to their length and the tubes of one slat link 75 fit into corresponding spaces between the tube 82 of the adjacent slat links. Axles 70 pass through the tubes when aligned to form an integrated endless belt structure.

Top and bottom slat link covers 78 and 80 are shown and described in the specification and claims as each being comprised of a single piece of metal. It will be understood, however that either or both of said covers may in practice be constructed from a plurality of pieces which are welded together to create the complete covers shown and described. For instance, top cover plate 78 may be constructed by providing two reverse-image half sections which are individually welded to flange 76a along its longitudinal center point above the web of I-beam 76 to create a top cover plate in accordance with the invention.

Side members 62 are located at the outward edges of each slat link 75 and extend vertically in a plane parallel to the conveying direction A. Slide members 62 are preferably attached to top slat link cover 78 by welding. The location of side members 62 on the outward ends of slat links 76 is such that there is an overlapping of adjacent side members 62 on adjacent slat links 75 in the completed conveyor belt 32, as is known in the art. In their preferred form, best shown in FIG. 7, side members 62 widen along the plane parallel to the conveying direction as they extend vertically so that their top edges overlap adjacent side members to a greater extent than the lower portions of the members. The provision of such upstanding members 62 helps to reduce spillage over edges of the belt 32 onto the roller chain 69 or the support structure. Also, as shown in FIG. 4 vertical support members 28 may extend above the conveyor on which extensions are mounted loading guide planes 68 which overlap on the inside the side members or flanges 62 and act to deflect material onto the conveyor belt so that it may be transported.

Through the arrangement of the transverse I-beam 76 within the slat links 75, loadings placed upon the conveyor are supported primarily on the plane of flat portion 78a of the top slat link cover plate 78 because portions 78b extend downwardly away from this plane and the connections between adjacent slat links at tubes 82 are then somewhat protected from damage by material placed on the conveyor by being disposed generally below the plane of portions 78a. It can also be seen that shock loadings on the conveyor at flat portions 78a are distributed internally by the central transverse I-beam 76 rather than by the slat link cover portion. Thus, a slat link of lighter construction may be employed. When used in conjunction with the above-described conveyor apparatus, it can be seen that shock loadings contacting the top surface of the conveyor at the plane defined by top slat link cover portion 78a are distributed outwardly through transverse I-beam 76 to chain rollers 60. The loading causes track 48 and track support blocks 50 to move downwardly against the restraining force of shear blocks 54. Track support blocks 50 then contact the upper surface of transverse track support beam 30 which allows the resilient support system of the conveyor structure which has been previously described to absorb the shock. Thus, damage is significantly reduced to the conveyor slat links and a corresponding reduction in maintenance and replacement expenses is realized when an endless conveyor belt comprised of slat links having transverse beams therein is used on a conveyor having a resilient support structure which resiliently absorbs shock loadings in the lateral, longitudinal and vertical directions.

The relationship of conveyor belt 32 to loading end 22 of the conveyor 20 is shown in FIG. 9. Conveyor belt 32 passes around idler spocket 90 at loading end 22 of conveyor 20. Roller chains 60 move along track 48 in the conveying direction with slat links extending therebetween.

It will be understood that conveyor track 48 need not be resiliently suspended on track support block 50 but that conveyor track 48 or track support block 50 may be mounted directly on transverse track support beam 30 so that only the resilient rubber shear blocks 36 and 38 attached to the transverse track support beam 30 act to absorb shock loadings on the conveyor belt.

While the invention has been described in the more limited aspects of a preferred embodiment and in conjunction with specific parts and arrangement of parts, other embodiments of the invention will occur to those skilled in the art, all of which are intended to be included within the scope of the present invention which is to be limited only by the scope of the appended claims as interpreted from the specification presented above.

What is claimed is:

1. A conveyor comprising: an endless conveyor belt traveling along a conveyor track, a plurality of supports for said track and a plurality of sets of rubber shear blocks located between said track and each of said supports and acting in shear to resiliently support said track thereon, a first set of said rubber blocks acting in shear only in the lateral and vertical directions relative to the length of said conveyor and another set of said rubber blocks acting in shear only in the longitudinal and vertical directions relative to the length of said conveyor, the said plurality of rubber blocks, in combination, coacting to resiliently support the said track in the said lateral, longitudinal and vertical directions relative to the length of said conveyor.

2. A conveyor as described in claim 1 and having the said first set of rubber blocks each fastened at one end to one of said supports and at the other end to one of a plurality of supporting beams extending transversely of said conveyor for resiliently supporting said beams on said supports, said track being attached to each of said beams.

3. A conveyor comprising: an endless conveyor belt travelling along a conveyor track, a plurality of supports for said track and a plurality of resilient means located between said track and each of said supports for resiliently supporting said track thereon, said resilient means being resilient in the lateral, longitudinal and vertical directions relative to the length of said conveyor, said resilient means comprising a first set of resilient means each fastened at one end to one of said supports and at the other end to one of a plurality of supporting beams extending transversely of said conveyor for resiliently supporting the said beams on said supports in the said lateral, longitudinal and vertical directions, and a second set of resilient means for resiliently supporting said track on and attaching it to said supporting beams, said second set of resilient means being resilient in the longitudinal and vertical directions relative to said conveyor length.

4. The conveyor as described in claim 3 wherein said first and second sets of resilient means are comprised of a first and second set of rubber shear blocks respectively.

5. The conveyor as described in claim 4 wherein said plurality of supports comprise a plurality of support stations disposed in a spaced parallel relationship on opposite sides of said conveyor, one of said plurality of supporting beams being associated with each of a pair of said support stations, one located on either side of said conveyor and said first set of rubber shear blocks are attached so as to resiliently suspend each of said supporting beams at its ends to its corresponding pair of support stations.

6. The conveyor as described in claim 3 in which said endless conveyor belt comprises a plurality of slat links, each of said slat links having a reinforcing beam therein extending transversely of said conveying direction within said slat link, adjacent slat links being interconnected by common, transversely extending axle shafts.

7. The conveyor as described in claim 6 in which each of said slat links comprise a top and bottom cover plate and said reinforcing beam is an I-beam passing between said cover plates.

8. The conveyor as described in claim 7 in which said top and bottom cover plates of each of said slat links converge toward each other to a juncture and are connected to a plurality of spaced tubular members at said juncture, said axle shafts passing through said tubular members.

9. The conveyor as described in claim 6 in which said reinforcing beam is an I-beam.

10. The conveyor as described in claim 6 further including upstanding side portions on each of said slat links located near the ends and disposed laterally thereof.

11. The conveyor as described in claim 10 further including a deflector plane disposed above said conveyor belt and extending downwardly to the plane of said conveyor belt and inwardly of said upstanding side portions.

12. In a conveyor having an endless conveyor belt travelling along a pair of longitudinally extending conveyor tracks, a plurality of supports comprising a series of spaced, parallel support stations on opposite sides of said conveyor; a transverse support beam passing between associated pairs of said support stations laterally of said conveyor; a first set of resilient means connected at one end to said support station and at the other end to the corresponding end of said transverse support beam to resiliently support it in place and a second set of resilient means connecting said track to and mounting it on said support beam wherein said first and second sets of resilient means comprise a plurality of rubber shear blocks having shear planes disposed so as to absorb shock loadings on said conveyor in the lateral, longitudinal and vertical directions relative to the length of said conveyor.

13. A conveyor comprising an endless conveyor belt traveling along a pair of longitudinally extending conveyor tracks, a plurality of track support means spaced along the conveyor on opposite sides thereof with the support means on one side of said conveyor disposed opposite respective ones of said support means on the other side of said conveyor to form associated pairs thereof, each of said track support means comprising a pair of upstanding and rigidly interconnected support members spaced apart longitudinally of the conveyor, a plurality of transverse track support beams extending laterally of the conveyor below the said conveyor tracks and spaced apart longitudinally of the conveyor, said support beams passing at their opposite ends between the support members of respective pairs or said support means, each of said support means having a set of rubber shear blocks each secured at one of their opposite shear face sides to said support means and at their other shear face sides to the opposite sides and end, respectively, of the associated transverse track support beam to resiliently support it in place and absorb shock loadings on the conveyor in the vertical, lateral and longitudinal directions relative to the length thereof, and a plurality of pairs of track supporting rubber shear blocks resiliently supporting said conveyor tracks on respective ones of said transverse support beams, the rubber shear blocks of each said pair thereof being disposed adjacent and on opposite sides of a respective one of said conveyor tracks and having their opposite side shear faces respectively secured to the said one conveyor track and to the said respective one of said support beams to absorb shock loadings on the conveyor in both the vertical and longitudinal directions relative to the length of the conveyor.

14. A conveyor comprising an endless conveyor belt travelling along a pair of longitudinally extending conveyor tracks, a track supporting sub-frame assembly disposed below said tracks and comprising a plurality of transverse track support beams extending transversely of said conveyor in spaced apart relation along the length thereof and rigidly interconnected by a plurality of longitudinally extending connecting beams, a series of support stations spaced along opposite sides of said conveyor and each comprising a pair of vertical support members, resilient means mounting the end portions of each of said transverse support beams on respective pairs of said support members to floatingly suspend the said sub-frame assembly therefrom and absorb shock loadings on said conveyor in the lateral, longitudinal and vertical directions, and secondary resilient means mounting the conveyor tracks on said transverse support beams to absorb shock loadings on said conveyor in both the vertical and longitudinal directions.

15. A conveyor as set forth in claim 14, wherein the said resilient means are comprised of rubber shear blocks.

* * * * *